United States Patent
Boldrini et al.

[11] Patent Number: 5,190,141
[45] Date of Patent: Mar. 2, 1993

[54] STABILIZING OUTPUT CONVEYOR FOR A CIGARETTE PACKING MACHINE

[75] Inventors: Fulvio Boldrini, Ferrara; Alessandro Minarelli; Antonio Gamberini, both of Bologna, all of Italy

[73] Assignee: G.D Societa' per Azioni, Bologna, Italy

[21] Appl. No.: 821,029

[22] Filed: Jan. 15, 1992

[30] Foreign Application Priority Data

Jan. 25, 1991 [IT] Italy .......................... BO91A000020

[51] Int. Cl.⁵ .............................................. B65G 47/91
[52] U.S. Cl. ............................... 198/689.1; 198/471.1; 198/457
[58] Field of Search ................... 198/688.1, 689.1, 457, 198/471.1, 612, 620, 604; 414/793, 797

[56] References Cited

U.S. PATENT DOCUMENTS

| | | | |
|---|---|---|---|
| 2,988,402 | 6/1961 | Policansky | 198/457 X |
| 3,035,695 | 5/1962 | Buchwald et al. | 198/689.1 X |
| 3,775,862 | 12/1973 | Emge | 198/471.1 X |
| 3,983,987 | 10/1976 | Lynch | 198/689.1 X |
| 4,722,432 | 2/1988 | Staton | 198/451 X |
| 4,773,522 | 9/1988 | Lenhart | 198/689.1 X |
| 4,883,163 | 11/1989 | Gamberini et al. | 198/471.1 X |
| 4,921,398 | 5/1990 | Fluck | 198/689.1 X |

FOREIGN PATENT DOCUMENTS 0192612  8/1986  Japan .................................. 198/457

Primary Examiner—Robert P. Olszewski
Assistant Examiner—James R. Bidwell
Attorney, Agent, or Firm—Marshall, O'Toole, Gerstein, Murray & Bicknell

[57] ABSTRACT

A conveyor for stabilizing packs of cigarettes coming off a packing machine, the conveyor being substantially U-shaped, and defined by two substantially straight end portions connected by a curved portion extending about a cylindrical drum having two peripheral flanges and tangent to the two end portions. The packs, in the form of a rectangular parallelepipedon, are fed along the end portions in a direction crosswise in relation to the larger lateral surface, and with the smaller opposite lateral surfaces gripped between two conveyor belts, and are positioned, along the curved portion, radially in relation to the drum, with one end surface contacting a suction belt extending in contact with the lateral surface of the drum and between the two flanges.

7 Claims, 4 Drawing Sheets

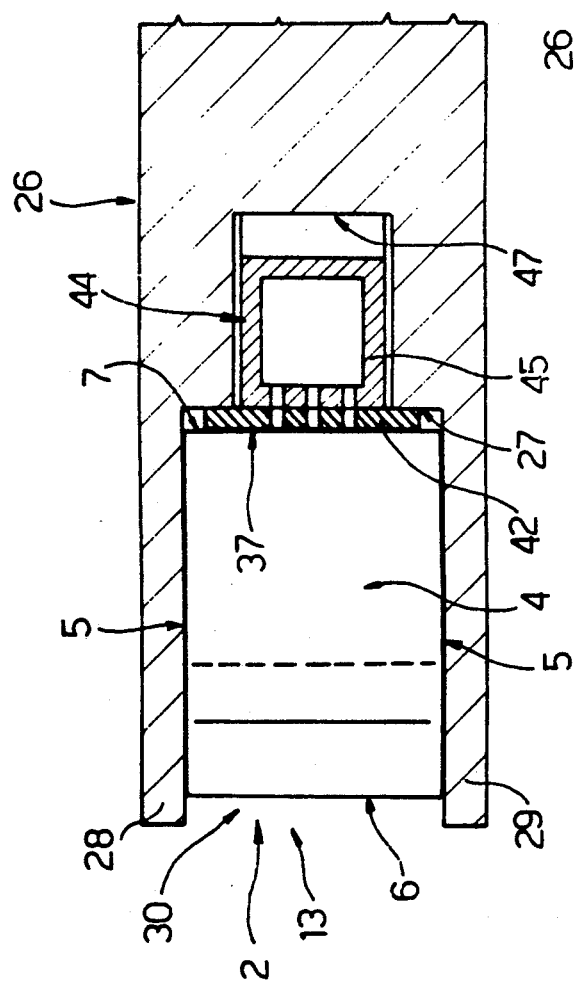
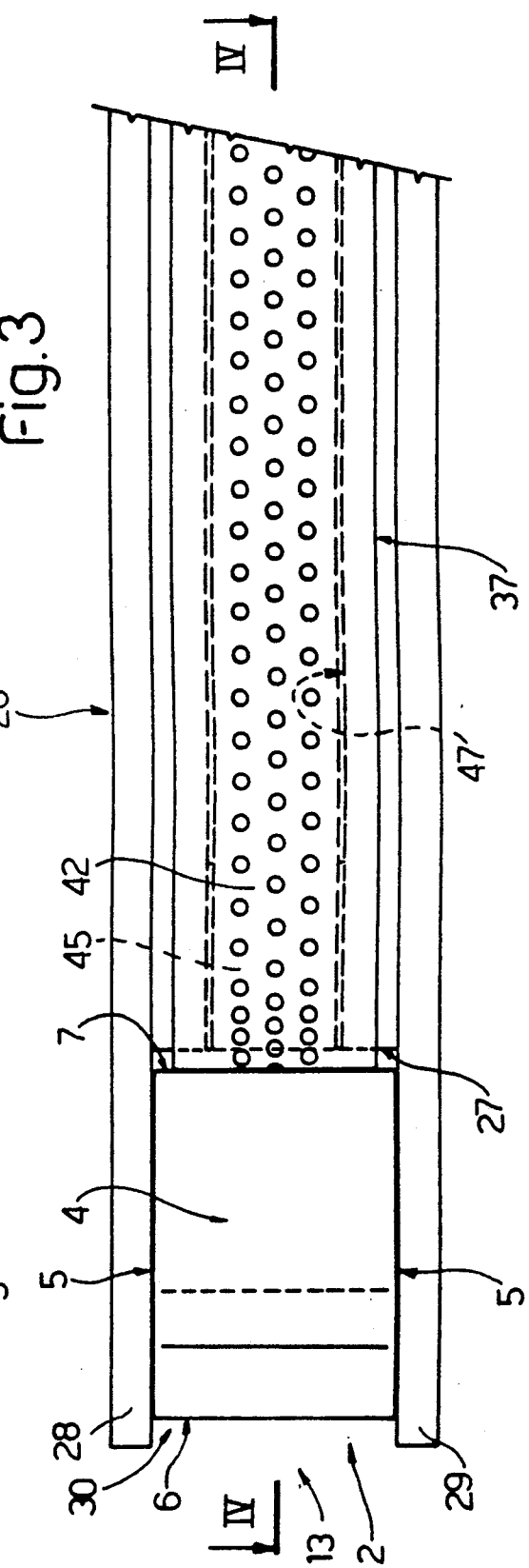

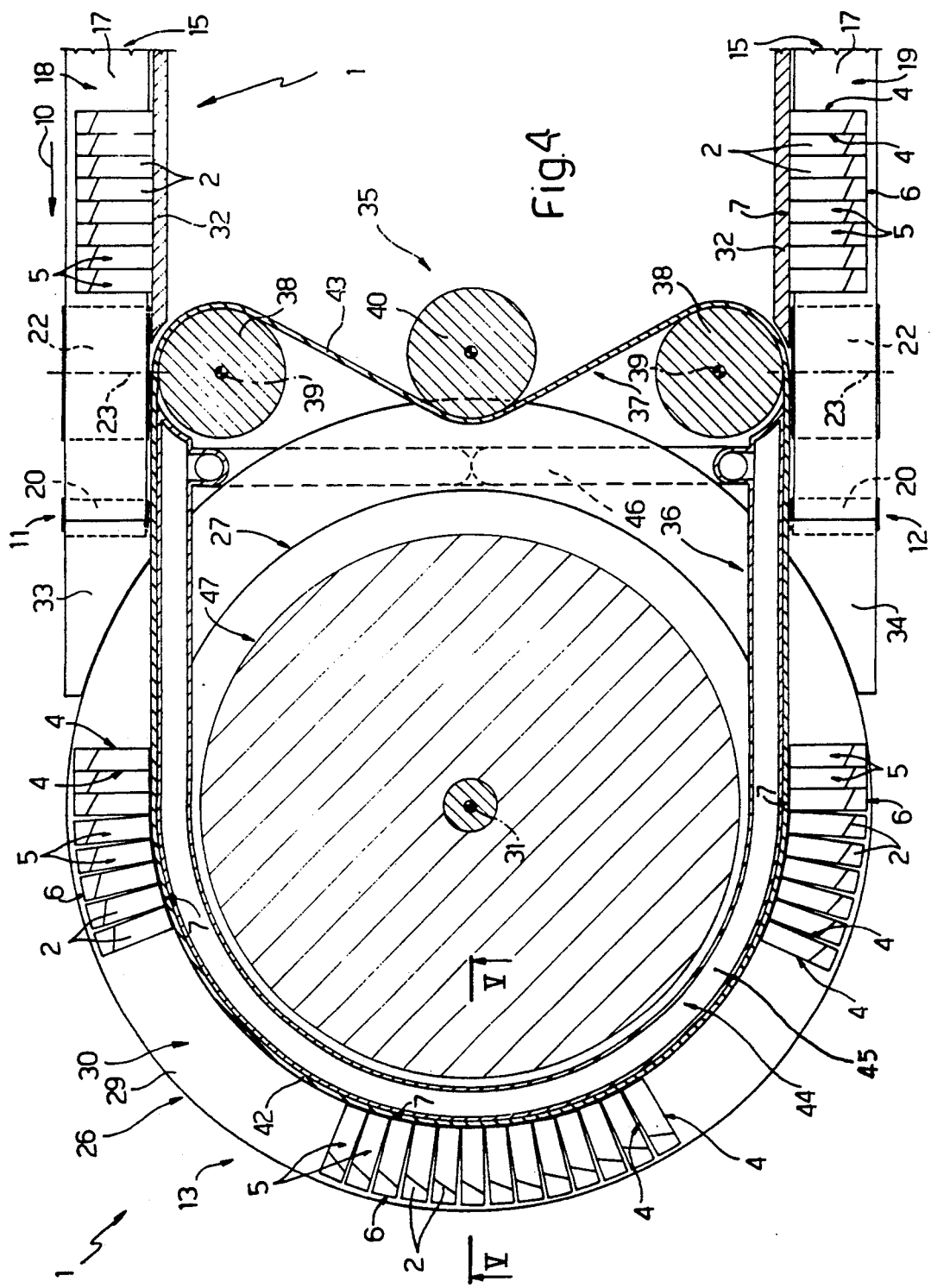

STABILIZING OUTPUT CONVEYOR FOR A CIGARETTE PACKING MACHINE

BACKGROUND OF THE INVENTION

The present invention relates to a stabilizing output conveyor for a cigarette packing machine.

In particular, the present invention relates to a conveyor for stabilizing flip-top cigarette packs, and constituting the output conveyor of a packing machine of the type described and claimed in co-pending Italian patent application No. B091A000019 filed concurrently by the present Applicant, and to which full reference is made herein in the interest of full disclosure. U.S. patent application Ser. No. 07/831,357 filed Jan. 15, 1992 corresponds to that Italian application and its disclosure is incorporated herein by reference.

In the above co-pending patent application, there is described a stabilizing conveyor extending over a cigarette packing machine, for successively feeding the packs along a substantially U-shaped path.

SUMMARY OF THE INVENTION

It is an object of the present invention to provide a stabilizing conveyor of the aforementioned type designed to feed the packs in orderly aligned manner along said U-shaped path.

According to the present invention, there is provided a conveyor for stabilizing packs of cigarettes coming off a packing machine; said packs being shaped in the form of a rectangular parallelepipedon, and being fed on to and along said stabilizing conveyor in a direction crosswise to the larger lateral surface; said conveyor being substantially U-shaped and defined by two substantially straight end portions connected by a curved intermediate portion; characterized by the fact that, for each said end portion, it comprises two conveyors having facing parallel branches traveling in said direction and defining, in between, a straight channel the width of which, measured between said facing branches, substantially equals that of said packs; and by the fact that, for said intermediate portion, it comprises a drum having a peripheral annular channel of substantially the same width as said straight channels, and a bottom annular surface tangent to an inner surface of each said straight channel; drive means being provided for rotating said drum about an axis perpendicular to said channels, and at a given surface speed substantially equal to the speed of at least one portion of said conveyors relative to at least one said end portion; said drive means comprising a suction belt defining part of the inner surface of said straight channels, and wound on to said drum along a portion of said annular channel.

On the above conveyor, the packs travel along the first of said end channels, gripped between the two facing branches of the respective conveyors, and with their larger lateral surfaces contacting one another. The packs thus travel along said first channel in a perfectly orderly line up to the suction belt at the end portion of the channel adjacent to said annular channel. Upon the end surface of the packs contacting the suction belt, the packs are fed into the annular channel, with the end surface still contacting the suction belt and, therefore, the bottom surface of the annular channel. As the position of the packs is controlled constantly by the suction belt as the packs travel from the first end channel to the annular channel, and along the annular channel to the second end channel, the packs travel in an orderly line along the entire length of the conveyor, and, on engaging the annular channel, are all automatically arranged in a neat radial position in relation to the drum.

BRIEF DESCRIPTION OF THE DRAWINGS

A non-limiting embodiment of the present invention will be described by way of example with reference to the accompanying drawings, in which:

FIG. 3 shows a partial side view of a detail in FIG. 2;

FIG. 4 shows a section along line IV—IV in FIG. 3;

FIG. 5 shows a section along line V—V in FIG. 4.

DETAILED DESCRIPTION OF THE INVENTION

Figure 1:
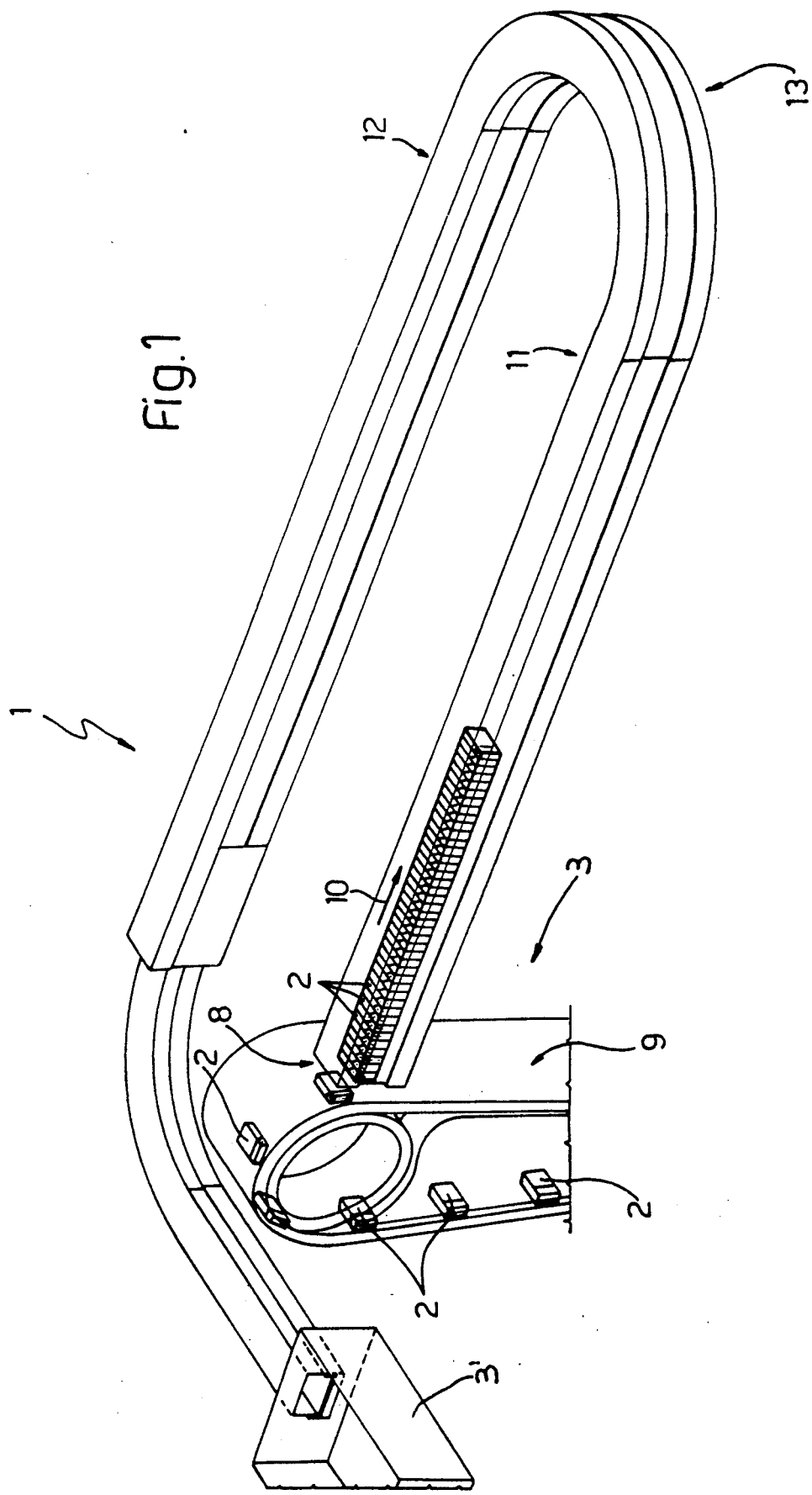
FIG. 1 shows a schematic view in perspective, with parts removed for simplicity, of a preferred embodiment of the stabilizing conveyor according to the present invention.

Number 1 in FIG. 1 indicates a conveyor for stabilizing packs of cigarettes 2 off a packing machine 3, and successively feeding packs 2 to a follow-up machine 3'. As shown particularly in FIGS. 3 and 4, packs 2 are shaped in the form of a rectangular parallelepipedon, with two large lateral surfaces 4, two small lateral surfaces 5, and two end surfaces 6 and 7. Packs 2 are fed successively to the input station 8 of conveyor 1 by a loop conveyor 9, and travel along conveyor 1 at a given, substantially constant speed in a direction 10 crosswise to larger lateral surfaces 4.

Figure 2:
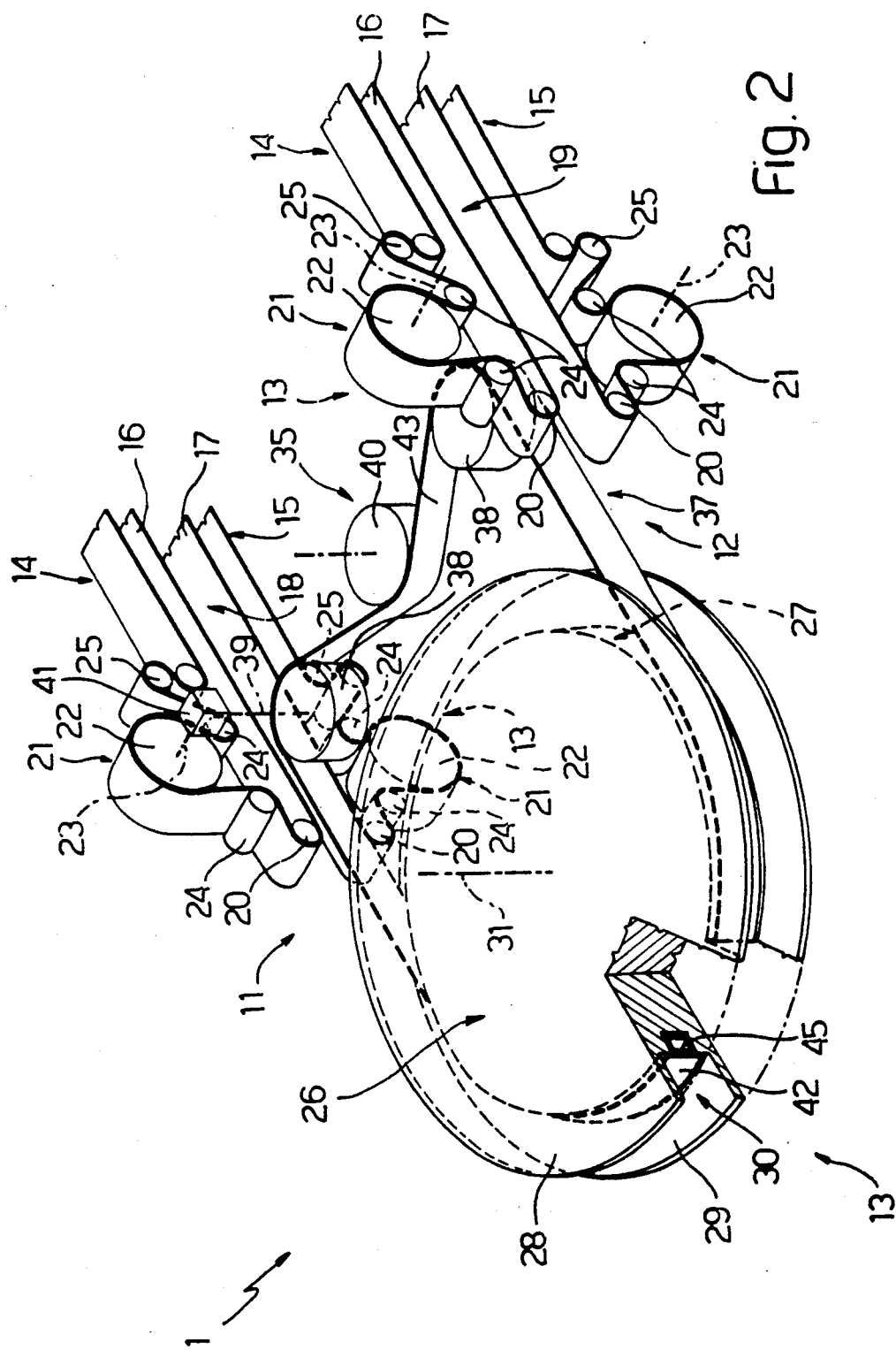
FIG. 2 shows a schematic view in perspective, with parts removed for simplicity, of a detail in FIG. 1.

Conveyor 1 extends substantially horizontally, and is substantially U-shaped with two substantially straight end portions 11 and 12 connected by a curved intermediate portion 13. As shown in FIG. 2, each end portion 11 and 12 comprises two loop conveyors 14 and 15 having respective facing parallel branches 16 and 17 traveling at said speed in direction 10, and defining a straight channel, numbered 18 for portion 11 and 19 for portion 12, the width of which, measured between facing branches 16 and 17, is substantially equal to that of packets 2.

Each conveyor 14 and 15 is looped about two end pulleys 20 (only one of which is shown), and presents, close to intermediate portion 13, a drive unit 21 comprising a drive pulley 22 with its axis 23 perpendicular to portions 11 and 12; two guide pulleys 24 on either side of pulley 22; and tensioning pulley 25.

As shown particularly in FIG. 2, intermediate portion 13 comprises a conveyor drum 26 defined externally by a cylindrical surface 27, and having, at opposite ends, two annular flanges 28 and 29 defining, together with surface 27, a peripheral annular channel 30 of substantially the same width as straight channels 18 and 19. Surface 27, constituting the bottom surface of channel 30, is tangent, along diametrically-opposite portions in relation to the rotation axis 31 of drum 26 perpendicular to axes 23, to the planes of two plates 32 (FIG. 4) respectively defining the initial inner portion of channel 18 and the inner end portion of channel 19. Channels 18 and 19 are connected to said respective portions of channel 30 by respective fixed plates 33 and 34 coplanar to branches 17 and flange 29.

Drum 26 presents a drive device 35 by which it is rotated about axis 31 at a surface speed substantially equal to the speed of conveyors 14 and 15. Drive device 35 comprises a vacuum device 36 defining the end portion of the inner surface of channel 18 and the initial portion of the inner surface of channel 19, extending along fixed plates 33 and 34, and wound on to surface 27 of drum 26 along the portion of annular channel 30 extending between plates 33 and 34.

Vacuum device 36 comprises a looped belt 37 permeable to air, and three pulleys, two of which, number 38, are transmission pulleys having axes 39 perpendicular and coplanar to axes 23, and the third of which is a tensioning pulley 40 with its axis of rotation parallel to axes 39. Between one of pulleys 38 and adjacent pulley 22, there is provided a known drive device 41 for driving belt 37 at substantially the same speed as conveyors 14 and 15.

Belt 37 comprises a substantially U-shaped operating branch 42 wound partially about drum 26 along channel 30; and a return branch 43 extending crosswise in relation to straight channels 18 and 19 between pulleys 38. The inner surface of operating branch 42 extends in contact with a suction device 44 forming part of device 36 and comprising perforated, substantially U-shaped conduit 45 extending between pulleys 3B and about drum 26. As shown in FIG. 4, conduit 45 communicates with an intake manifold 46, and engages an annular groove 47 formed centrally in bottom surface 27 of annular channel 30.

In actual use, packs 2 are fed into conveyor 1 at input station 8, and travel along channel 18 at substantially constant speed, with small lateral surfaces 5 gripped between branches 16 and 17 of respective conveyors 14 and 15. In this connection, it should be pointed out that, during the formation of packs 2, the portions folded and gummed last are those on small lateral surfaces 5, so that the substantially flexible pressure exerted by branches 16 and 17 as packs 2 travel along channel 18 provides for ensuring correct finish of the packs.

On reaching drive units 21 of conveyors 14 and 15 of end portion 11 and, consequently, respective pulley 38, packs 2 move over the end of plate 32 and are sucked on to belt 37 by which they are controlled along plate 33, annular channel 30 and plate 34, in such a manner as to prevent radial withdrawal from channel 30, and automatically arrange them radially in relation to drum 26 as they travel along intermediate portion 13.

Before reaching the other pulley 38, i.e. before leaving operating branch 42 of belt 37, packs 2 are fed into channel 19 between branches 16 and 17 of conveyors 14 and 15 of portion 12.

In other words, conveyor 1 provides for feeding packs 2 along a relatively long path, over which they are subjected to substantially no rubbing, and the shape of the packs is controlled constantly until they are fully stabilized.

According to a variation (not shown) of conveyor 1, conveyors 14 and 15 of portion 12 are driven by pulleys 22 at a greater speed than those of portion 11.

Consequently, under normal operating conditions of conveyor 1, the packs entering portion 12 from portion 13 are separated by a distance depending on the difference in the speed of belt 37 and conveyors 14 and 15 of portion 12.

This spacing of packs 2 along portion 12 is particularly useful in the event of stoppage of follow-up machine 3', in which case, machine 3 must be operated long enough to clear it of all the unfinished packs prior to stoppage of the system. In the final operating phase of machine 3, therefore, the remaining packs 2 on machine 3 are fed into portion 11, thus pushing together the packs 2 in portion 12.

According to a further variation (not shown) of conveyor 1, each of conveyors 14 and 15 of portion 12 is replaced by two consecutive conveyor belts. In this case, each belt adjacent to portion 13 may be operated at the same speed as conveyors 14 and 15 of portion 11, while the other in each pair is operated at a higher speed, thus spacing packs 2 between the two faster conveyors, as already described.

We claim:

1. A conveyor (1) for stabilizing packs of cigarettes (2) coming off a packing machine (3); said packs (2) being shaped in the form of a rectangular parallelepipedon, and being fed on to and along said stabilizing conveyor (1) in a direction (10) crosswise to the larger lateral surface (4); said conveyor (1) being substantially U-shaped and defined by two substantially straight end portions (11, 12) connected by a curved intermediate portion (13); characterized by the fact that, for each said end portion (11, 12), it comprises two conveyors (14, 15) having facing parallel branches (16, 17) traveling in said direction (10) and defining, in between, a straight channel (18, 19) the width of which, measured between said facing branches (16, 17), substantially equals that of said packs (2); and by the fact that, for said intermediate portion (13), it comprises a drum (26) having a peripheral annular channel (30) of substantially the same width as said straight channels (18, 19), and a bottom annular surface (27) tangent to an inner surface (32) of each said straight channel (18, 19); drive means (35) being provided for rotating said drum (26) about an axis (31) perpendicular to said channels (18, 19, 30), and at a given surface speed substantially equal to the speed of at least one portion of said conveyors (14, 15) relative to at least one said end portion (11, 12); said drive means (35) comprising a suction belt (36) defining part of the inner surface of said straight channels (18, 19), and wound on to said drum (26) along a portion of said annular channel (30).

2. A conveyor as claimed in claim 1, characterized by the fact that it also comprises fixed connecting means (33, 34) between each said straight channel (18, 19) and a respective portion of said annular channel (30); said suction belt (36) extending along said fixed connecting means (33, 34), and said portion of said annular channel (30) extending between said fixed connecting means (33, 34).

3. A conveyor as claimed in claim 1, characterized by the fact that said suction belt (36) comprises a permeable looped belt (37), and transmission means (38) for said permeable belt (37), located adjacent to each said straight channel (18, 19); said permeable belt (37) comprising a substantially U-shaped operating branch (42) wound partially about said drum (26), and a return branch (43) extending crosswise in relation to said straight channels (18, 19) between said transmission means (38).

4. A conveyor as claimed in claim 3, characterized by the fact that said suction belt (36) also comprises a suction device (44) extending in contact with the inner surface of said operating branch (42).

5. A conveyor as claimed in claim 3, characterized by the fact that at least one said transmission means (38) is connected to a respective said conveyor (14) for operating said permeable belt (37) at said speed and in said direction (10).

6. A conveyor as claimed in claim 1, characterized by the fact that said drum (26) presents a substantially cylindrical outer surface (27), and two annular outer flanges (28, 29); said flanges (28, 29) defining, together with said outer surface (27), said annular channel (30).

7. A conveyor as claimed in claim 1, characterized by the fact that at least one portion of said conveyors (14, 15) of one said end portion (12) is driven at a greater speed than said conveyors (14, 15) of said other end portion (11).

* * * * *